United States Patent [19]
Meritt

[11] Patent Number: 5,530,897
[45] Date of Patent: Jun. 25, 1996

[54] SYSTEM FOR DYNAMIC ASSOCIATION OF A VARIABLE NUMBER OF DEVICE ADDRESSES WITH INPUT/OUTPUT DEVICES TO ALLOW INCREASED CONCURRENT REQUESTS FOR ACCESS TO THE INPUT/OUTPUT DEVICES

[75] Inventor: Allan S. Meritt, Poughkeepsie, N.Y.

[73] Assignee: International Business Machines Corporation, Armonk, N.Y.

[21] Appl. No.: 130,218

[22] Filed: Oct. 1, 1993

[51] Int. Cl.[6] ............................ G06F 13/00; G06F 13/14; G06F 13/38

[52] U.S. Cl. ........................ 395/829; 395/828; 395/823; 395/401; 395/427; 340/825.03; 340/825.52; 369/30; 364/927.99; 364/935.44; 364/940.71

[58] Field of Search ....................... 395/275, 200, 395/828, 829, 823, 401, 427; 340/825.03, 825.52; 369/30; 364/927.99, 935.44, 940.71

[56] References Cited

U.S. PATENT DOCUMENTS

| | | | |
|---|---|---|---|
| 4,373,181 | 2/1983 | Chisholm et al. | 364/200 |
| 4,396,984 | 8/1983 | Videki, II | 364/200 |
| 4,459,664 | 7/1984 | Pottier et al. | 364/200 |
| 4,645,873 | 2/1987 | Chomet | 379/93 |
| 4,661,902 | 4/1987 | Hochsprung et al. | 364/200 |
| 4,689,786 | 8/1987 | Sidhu et al. | 370/94 |
| 4,773,005 | 9/1988 | Sullivan | 364/200 |
| 4,843,541 | 6/1989 | Bean et al. | 364/200 |
| 4,855,905 | 8/1989 | Estrada et al. | 364/200 |
| 5,150,464 | 9/1992 | Sidhu et al. | 395/200 |
| 5,313,587 | 5/1994 | Patel et al. | 395/275 |

FOREIGN PATENT DOCUMENTS

| | | |
|---|---|---|
| 59-101947 | 6/1984 | Japan . |
| 3-225417 | 10/1991 | Japan . |

OTHER PUBLICATIONS

"Post Suspend Resume", IBM Technical Disclosure Bulletin, New York, U.S., Feb., 1981, pp. 4228–4230.

*Primary Examiner*—Thomas C. Lee
*Assistant Examiner*—Rehana Perveen Krick
*Attorney, Agent, or Firm*—JoAnn K. Crockatt; Andrew J. Dillon

[57] ABSTRACT

Disclosed is a data processing system for presenting concurrent requests for access to peripheral devices up to the number of subchannels available for handling input/output operations. A computer system provides a plurality of subchannels and affiliated unit control blocks for input/output operations between main storage and the peripheral devices. The unit control blocks comprise two groups, including a first dedicated to the peripheral devices and a second group available for dynamic association with the peripheral devices on a demand basis. The unit control blocks are termed base unit control blocks and alias unit control blocks, respectively. Upon system initialization, alias unit control blocks for a given logical subsystem are linked in a free pool. To initiate an input/output operation a program executing on the CPU first queries a base unit control block for a target peripheral device to determine its availability. If available, the base unit control block and associated base subchannel are used for the input/output operation. If not, determination is made if an alias unit control block may be used and if any are available. Responsive to affirmative determinations, an alias unit control block is removed from the free pool and is linked to the base unit control device for the target peripheral device in an exposure chain. The CPU then places a channel program in main storage including a prefix channel command for binding an alias address for the alias unit control block with a particular device. This is done by passing the binding command to a controller for the target peripheral device which maintains tables of affiliations between aliases and peripheral devices on a path group basis. After binding, the input/output operation proceeds in conventional fashion.

20 Claims, 8 Drawing Sheets

SYSTEM FOR DYNAMIC ASSOCIATION OF A VARIABLE NUMBER OF DEVICE ADDRESSES WITH INPUT/OUTPUT DEVICES TO ALLOW INCREASED CONCURRENT REQUESTS FOR ACCESS TO THE INPUT/OUTPUT DEVICES

BACKGROUND OF THE INVENTION

1. Technical Field

The invention relates to input and output of data to and from main storage for a data processing system, and more particularly relates to a system and method of dynamic allocation of subchannels to input/output (I/O) peripheral devices.

2. Description of the Related Art

Input/output peripheral devices include any device available to a computer as an external source of data, as an external destination for data, or both. For example, computer systems use tape drives and disk drives for mass storage of data. Such devices operate as input/output devices. A communications link used for formatting data for transmission over telephone lines is another example of an input/output device. User keyboards and video display terminals are input and output devices, respectively. Generally any place data can reside, excluding computer main storage (directly addressable memory), computer cache, interface buffers, or central processing unit registers, can serve as an input/output device.

An input operation is the transfer of data from an input/output device into the computer system. An output operation is a transfer of data from the computer system to an input/output device. In the architecture of main frame computer systems sold by International Business Machines Corporation, input or output operations are between main storage and the input/output device. The architecture includes a channel subsystem to direct the flow of data between input/output devices and main storage. Channel subsystems are intended to relieve computer central processing units (CPUs) of the task of communicating directly with input/output devices and to permit data processing to continue concurrently with input and output operations. The channel subsystem is connected to peripheral devices along one or more channel paths, each. Channel paths are identified to the computer and to control units for peripheral device to management of the flow of data. The channel subsystem provides for testing for channel path availability, channel path selection and initiation of input and output operations with a given peripheral device.

Within the channel subsystem are a plurality of subchannels, each of which provides the facility for supporting a single input/output operation. The subchannel provides a control data structure in which state information about operations started with respect to a device are maintained. In the prior art, a subchannel was dedicated to an input/output device, represented by a device address maintained in the subchannel and used to select the particular device on a channel path. Where so-called multiple exposure devices were used, a plurality of subchannels could be dedicated to the device. In all cases the plurality consisted of a fixed number of subchannels per device, each containing a unique device address used to select the device. All devices on a controller had the same number of subchannels. An example of a multiple exposure device is a disk drive having a device controller such as an IBM 3880 Model 21 controller which provides a storage device cache.

The IBM 3880 controller is a control unit used to handle connections between members of a group of magnetic disk units and computers requesting such connection. The IBM 3880 Model 21 type controller, which is available from IBM Corporation, can handle up to eight channels from host computers and up to eight magnetic storage units. Within the controller are two storage directors. Each storage director may be connected to up to four incoming channels from host computers, for a total of eight channels for the controller as a whole. Channels are physical links between the controller and the host computers. Usually, a host computer has two or four channels, half being physically connected to the one multipath storage director and the other half being connected to the other multipath storage director.

Requests for records (represented as addresses) directed to an input/output device under control of an IBM 3880 controller may be concurrent where one record is both in cache and on the device and the second record requested is only on a device. A record in storage device cache can be retrieved far more quickly than can a record on a disk or tape. The controller includes a processor for determining that the request for the record is stored on cache and therefore can be responded to more quickly than the request for the record only available on disk, and for handling the requests in that order (or even simultaneously since the request for a record in cache may well be completed before data is available from the record only on disk or tape). The ability of the controller to handle concurrent requests to an input/output device makes the device a multiple exposure device. A device may also become a multiple exposure device by having a plurality of volumes. Consider a tape drive library having one drive but a plurality of available tape cassettes which are automatically retrievable. Upon receipt of a plurality of requests one cassette may be more readily mounted than another, or may in fact already be mounted. One subchannel is required for each request applied to an input/output device.

In contrast, an example of a device without multiple exposures is a disk drive having a device controller such as an IBM 3990 controller which provides a storage device cache.

The IBM 3990 controller is a storage control unit used to handle connections between members of a group of magnetic disk units and computers requesting such connection. The IBM 3990 Model 3 type controller, which is available from IBM Corporation, can handle up to sixteen channels from host computers and up to sixty-four magnetic storage units. Within the controller are two multipath storage directors and four storage paths, two of which are associated with each multipath storage director. Each multipath storage director may be connected to up to eight incoming channels from host computers, for a total of sixteen channels for the controller as a whole. Each multipath storage director is connected to two storage paths, thus functioning as an 8×2 switch. Channels are physical links between the controller and the host computers. Usually, a host computer has two or four channels, half being physically connected to the one multipath storage director and the other half being connected to the other multipath storage director.

With a non-multiple exposure device, requests to a device can only be performed serially, since there is only a single subchannel for the device. Hence, requests for data already present in the cache must wait if a request for data only available on disk has already been started.

In the following detailed description, many details of the IBM 3990 controller are discussed as an example of an environment in which the present invention maybe advantageously employed. However, many of the unique details of the IBM 3990 controller are not required to practice the invention nor is use of the invention exclusively with such a controller to be inferred.

SUMMARY OF THE INVENTION

It is an object of the invention to provide an improved system and method for the input and output of data to and from main storage for a data processing system.

It is another object of the invention to provide a system and method of allocating subchannels and device addresses on a dynamic basis among multiple exposure input/output devices.

It is a further object of the invention to provide a system and method of presenting concurrent requests for access to multiple exposure input/output devices up to the number of subchannels available for handling input/output operations across all I/O devices within a single subsystem.

It is a further object of the invention to maximize access across the logical subsystem using a minimum number of subchannels and software control blocks.

It is a further object of the invention to adjust for workload changes in activity to devices across the logical subsystem by permitting a dynamically changing variable number of addresses to be used to access each device.

It is a further object of the invention to support access to more volumes than can be directly addressed by the I/O interface architecture.

It is a further object of the invention to provide a system and method to separate the device address which flows from the interface from the actual device to be selected.

The invention provides a system and method of presenting a plurality of concurrent input or output requests to each of a plurality of peripheral devices in a data processing system. A computer system provides a plurality of subchannels for controlling input/output operations between main storage and the peripheral devices. The plurality of subchannels are divided between first and second groups. The first group comprises base subchannels having a one to one correspondence with and dedicated to the peripheral devices. The second group comprises undedicated subchannels which are available for dynamic association with volumes on a peripheral devices on a demand basis; such association can be made with any volume within the logical subsystem.

A subchannel presents input/output operation status conditions to programs executing on a computer central processing unit (CPU) by association with and through a data structure called a unit control block. Base subchannels have unique addresses permanently bound to volumes on the particular peripheral devices to which they are dedicated. The unit control blocks associated with base subchannels are termed base unit control blocks while those associated with undedicated subchannels are termed alias unit control blocks. An alias subchannel has a unique address but is not permanently bound to a volume within a logical subsystem. Upon system initialization, alias unit control blocks for a given logical subsystem are linked in a free pool.

To initiate an input/output operation a program executing on the CPU first queries a base unit control block for a target peripheral device to determine availability of the base unit. If available, the base unit control block and associated base subchannel are used for the input/output operation. If not, determination is made from the base unit control block if an alias unit control block may be used. Responsive to affirmative determinations that an alias unit control block is available and may be used, an alias unit control block is removed from the free pool and is linked to the base unit control device for the target peripheral device in an exposure chain. The CPU then places a channel program in main storage including a prefix channel command for binding the alias for the alias unit control block with a particular device. This is done by passing the binding command to a controller for the target peripheral device which maintains tables of affiliations between aliases and peripheral devices. The binding command identifies the alias address being selected and includes an operand to identify the volume the operation is to be done on. After binding, the input/output operation proceeds in conventional fashion.

Responsive to an input/output interrupt, such as occurs upon completion of an input/output operation, it is determined if an input/output operation completed on an alias unit control block. If it did, the link between the implicated alias unit control block and the base unit control unit is broken and the alias unit control block is replaced in the linked free pool from which it was originally removed. Whether the operation completed on a base or on an alias unit control block the I/O operation is posted as complete.

Additional functionality is provided to queue work requests where use of an alias unit control block was prevented or not possible and to reattempt the request upon conclusion of an input/output operation on the base unit control block or any alias unit control block linked to the base unit control block.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
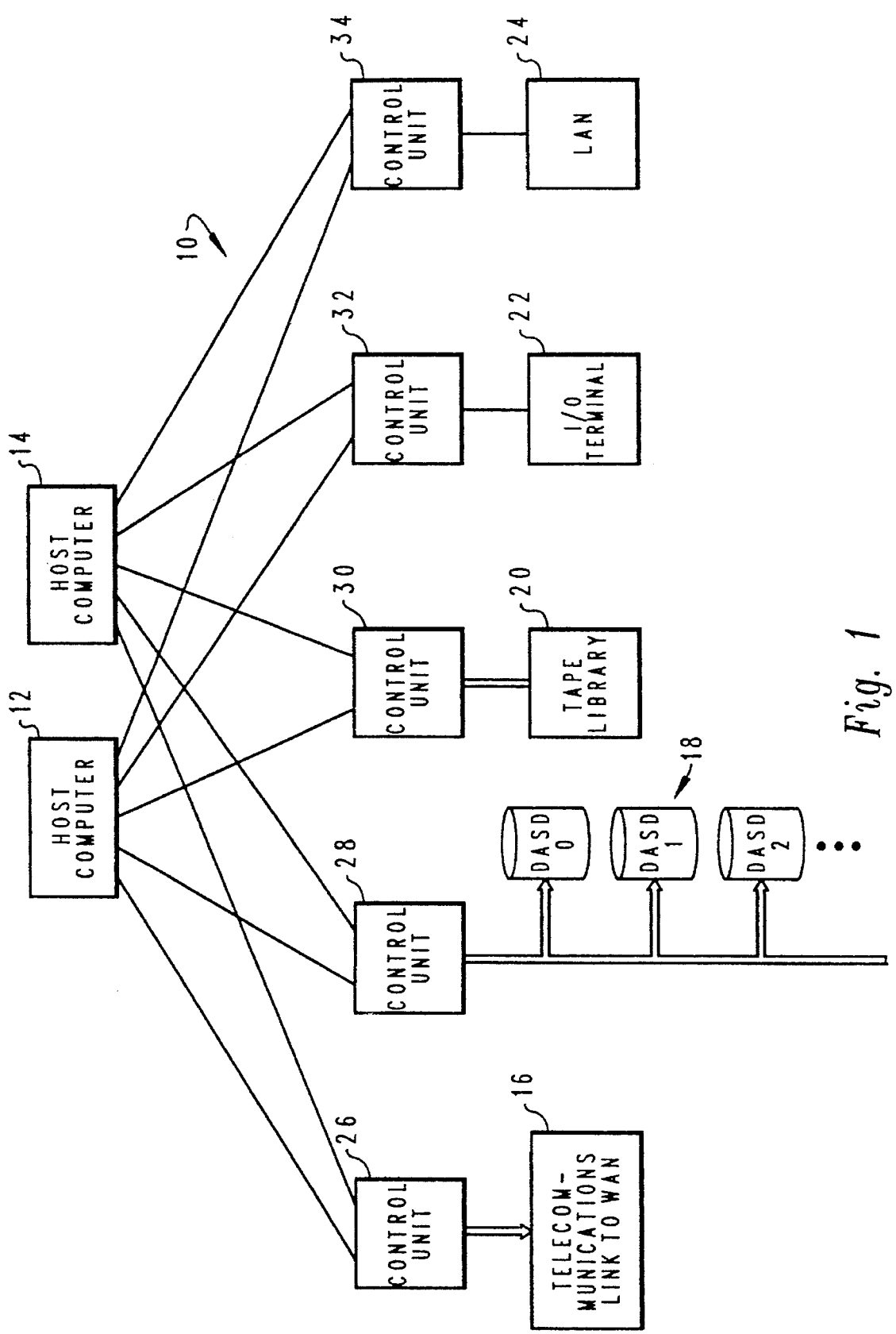
FIG. 1 is a high level block diagram of a data processing system which may be utilized to implement the method and system of the present invention.

With reference now to the figures and in particular with reference to FIG. 1, there is depicted a high level block diagram of a data processing system 10 including computer systems 12 and 14. Providing an interface between computer systems 12 and 14 and input/output (I/O) devices 16, 18, 20, 22 and 24 are a plurality of control units 26, 28, 30, 32 and 34, which have a one to one correspondence to the I/O devices. The I/O devices can serve a variety of functions. I/O device 16 provides a telecommunication link into a wide area network (WAN), as may be provided by a modem. I/O devices 18 are a set of disk volumes, any of which may consist of an array of disk drives. I/O device 20 includes a set of tape drives and associated library of tape cassette volumes. Device 22 is an input/output terminal. I/O device 24 may be a gateway into a local area network (LAN). The physical connections between host computers and control units are preferably provided by optical serial channels which may be up to 15 kilometers in length.

Figure 2:
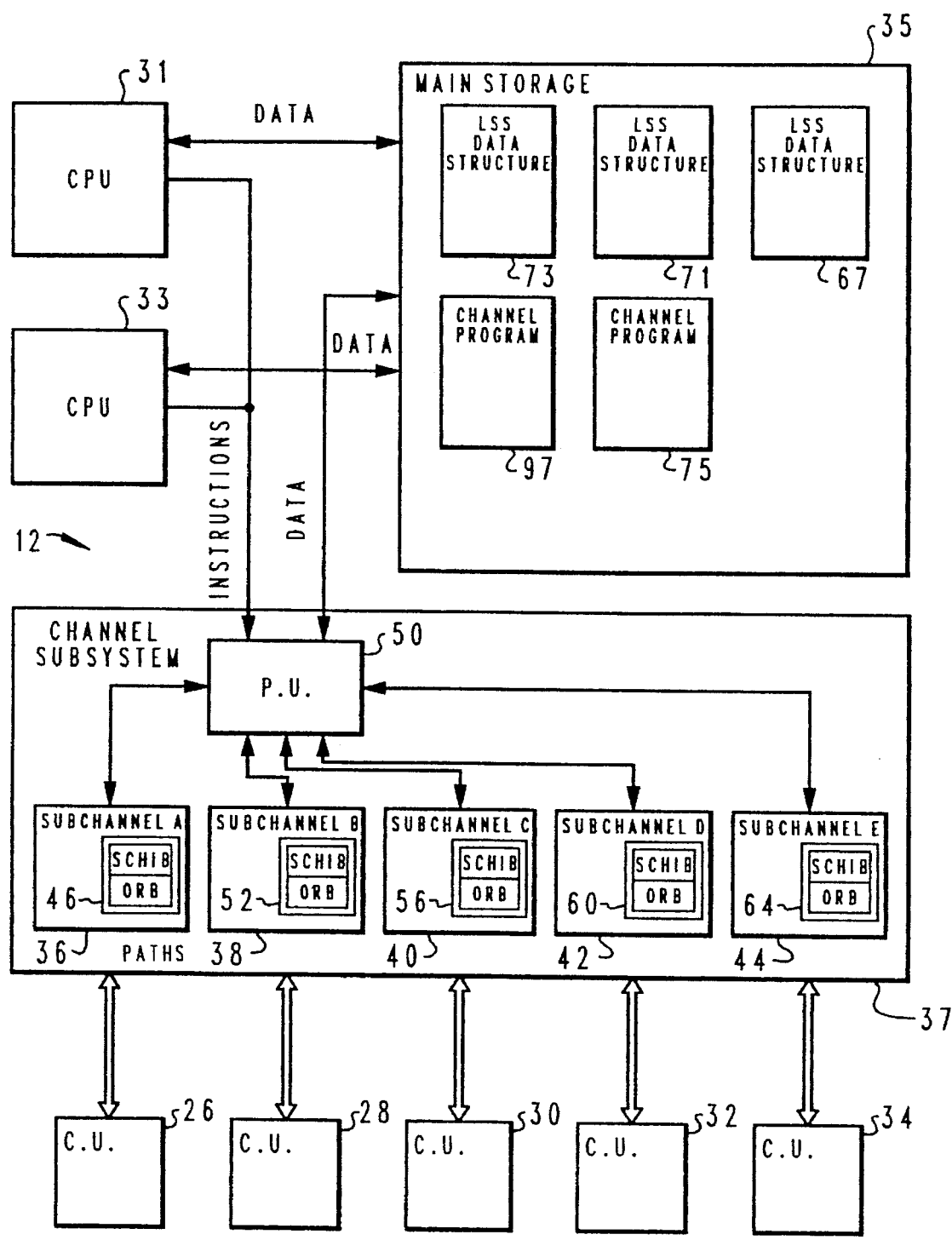
FIG. 2 is a high level block diagram of a host computer and channel subsystem.

FIG. 2 illustrates the logical organization of a computer system 12, representative of such systems. Computer system 12 includes a main storage 35 and first and second central processing units (CPUs) 31 and 33. A channel subsystem 37 provides an interface between computer system 12 and control units 26, 28, 30, 32 and 34. Communication of data between input/output devices and computer system 12 is handled by channel subsystem 37. A connection between the channel subsystem 37 and one of control units 26, 28, 30, 32, or 34 for an input/output device is a channel path.

Main storage 35 may be directly accessed by CPUs 31 and 33 to support high speed processing of data by the CPUs and high speed execution of channel programs by channel subsystem 37. CPUs 31 and 33 cannot directly access data from a peripheral storage device and therefore, before data and programs stored in auxiliary memory can be executed, they must be loaded into main storage 35. At any instant, channel subsystem 37 arid CPUs 31 and 33 have access to the same sections of main storage 35. Central processing units 31 and 33 contain the sequencing and processing facilities for instruction execution, interruption action, timing functions, initial program loading and other machine related functions. Instructions which the CPU's execute fall into five classes: general; decimal; floating point; control; and input/output instructions.

Input/output (I/O) operations involve the transfer of information between main storage 35 and an input/output peripheral device. Control units 26–34 are attached to the channel subsystem 37 which controls this data transfer. Channel subsystem 37 directs the flow of information to and from main storage 35. Use of channel subsystem 37 for data flow control relieves CPU's 31 and 33 of the task of communicating directly with input/output devices and permits data processing to proceed on CPUs 31 and 33 concurrently with input/output operations. Channel subsystem 37 uses one or more channel paths as a communication link to or from each input/output device. As part of input/output processing, channel subsystem 37 also performs testing for channel path availability, selecting an available channel path, and initiating execution of the operation with the I/O device, as explained more fully below.

Channel subsystem 37 includes a plurality of subchannels, including representative subchannels 36, 38, 40, 42 and 44, to support operations with input/output devices. Five subchannels are shown although the number of subchannels may be and typically is greater than the number of control units. Information contained in the subchannel pertinent to CPU input/output functions is passed to unit control blocks which are part of logical subsystem data structures (LSS) 67, 71 and 73 maintained in main storage 35. In main storage 35 the unit control blocks are accessible by CPUs 31 and 33.

Input/output operations are carried out on a subchannel by processing unit (PU) 50 in channel subsystem 37 by execution of channel programs 75 or 97. Channel programs 75 and 97 are stored in main storage 35 by CPUs 31 and 33. Control structures for each subchannel are stored in subchannel internal storage with: subchannel 36 including internal storage 46; subchannel 38 including internal storage 52; subchannel 40 including internal storage 56; subchannel 42 including internal storage 60; and subchannel 44 including internal storage 64. Communications between subchannels 36–44 and main storage 35 or CPUs 31 arid 33 occurs over an instruction bus. The data structures maintained in the subchannels include an operation request block (ORB) and a subchannel information block (SCHIB). The channel program includes the appropriate prefix channel command, which is an instruction for binding the alias for the alias unit control block with a particular device.

A subchannel provides the logical appearance of a device to a program executing on one of CPUs 31 or 33 and contains in internal storage 46 the information required for sustaining a single input/output operation, e.g. the movement of data between an input/output device and main storage 35. Internal storage 46 contains information providing a channel command word address, a channel path identifier, an actual or an alias device address, a count, status indications, input/output interruption subclass codes, path availability and functions pending or being performed. Internal storage 46 also contains a device address. This device address is sent to the control unit when performing an I/O operation to identify to the control unit the target of the I/O operation. The term "alias" is sometimes used interchangeably with address when referring to unit control blocks and subchannels. An alias refers to a device address like indicator located in an alias subchannel.

One subchannel is dedicated to each input/output volume accessible to a channel subsystem 37. For such dedicated subchannels the data structures supporting these subchannels include a device address and volume identification information permanently associated with the storage device to which the subchannel is dedicated. Subchannels which are not permanently dedicated also own a unique device address, termed an alias, through a supporting data structure. The alias device address may be temporarily bound to a volume by use of an appropriate channel command word, that is, the alias device address may be established as an alternate for the base device address.

After an operation with a subchannel has been requested by issuance of a start subchannel instruction, CPU 31 or 33 is released for other work and the channel subsystem assembles or disassembles data and synchronizes the transfer of data bytes between the I/O device and main storage 35. To accomplish this, channel subsystem 37 maintains and updates an address and a count that describe the destination or source of data in main storage. Similarly when an I/O device provides signals that are to be passed to the attention of a program executing on a CPU, channel subsystem 37 transforms the signals into status information and stores the information in the subchannel and to the appropriate unit control block where the information can be read by the program.

Each subchannel is identified by a system unique value by which it is addressed. A CPU accesses a subchannel using one of seven input/output instructions including: a clear subchannel; a halt subchannel; a modify subchannel; a resume subchannel; a start subchannel; a store subchannel; and a test subchannel. Normally the instructions are issued by a central processing unit. Main storage cycles used by channel subsystem 37 do not interfere or delay CPU program execution, except when the CPUs and the channel subsystem attempt to concurrently reference the same area in main storage 35.

Figure 3:
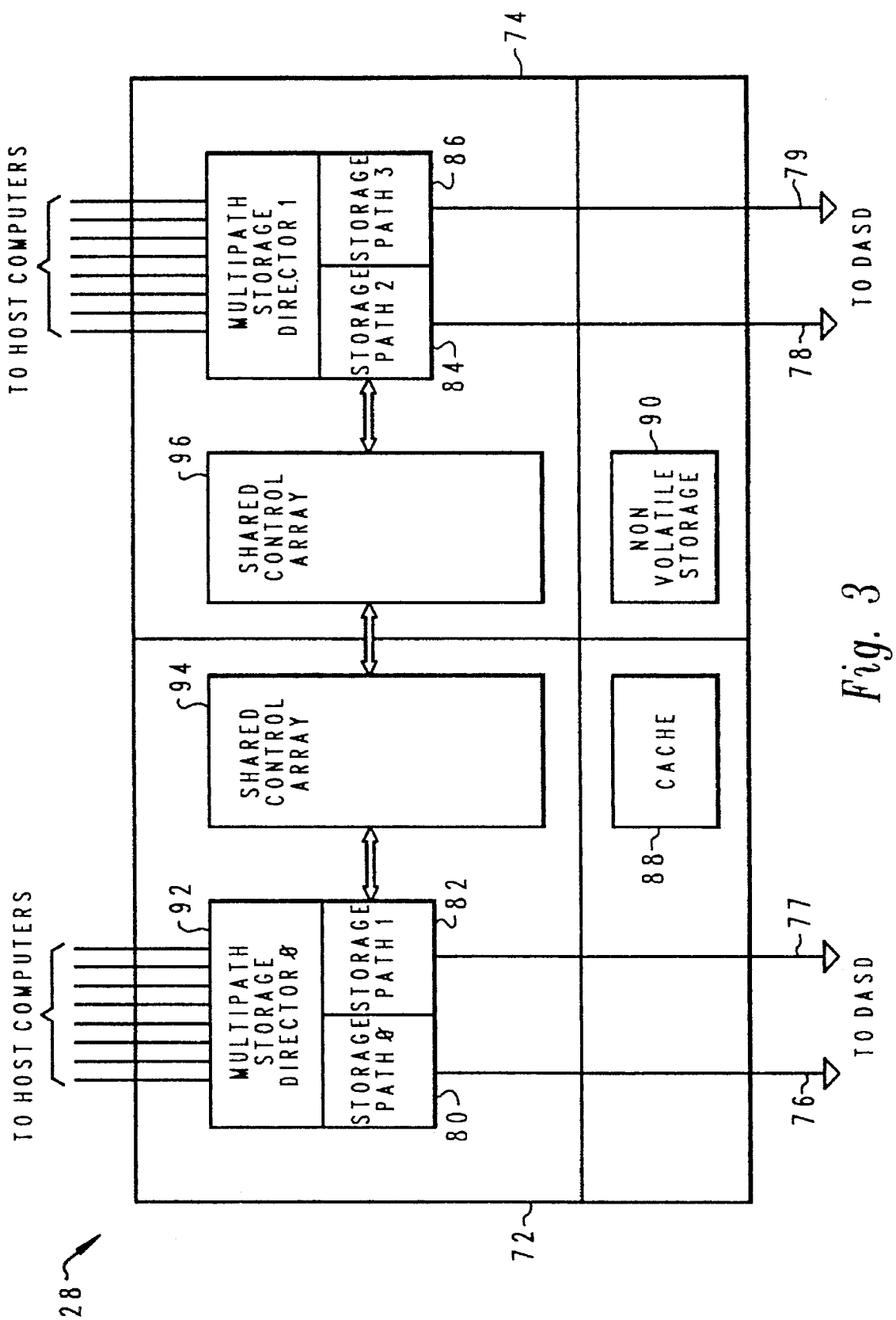
FIG. 3 is a high level block diagram of a control unit.

FIG. 3 depicts control unit 28 in greater detail. Controller 28 has two storage clusters 72 and 74, each of which provides for selective connection between a host computer and each of a plurality of direct access storage devices (shown in FIG. 1). Data from a given host computer system may be stored to any of the direct access storage devices. Data may also be retrieved from any of the direct access storage devices for a given host computer. Where a host computer is connected by at least two channels, one each is connected to storage clusters 72 and 74. Similarly, where four channels are provided, two are connected to storage cluster 72 and two to the second to storage cluster 74. Control unit 28 can receive a request from a host computer over a channel and respond to the request over any one of the channels connected to the same host computer. The channels associated with one host computer are known as a path group. Upon initialization of the operating system, control unit 28 is programmed with the path groups associated with each host.

Control unit 28 provides four paths 76, 77, 78 and 79 out to the direct access storage devices. Each data path is associated with one of storage path processors 80–86, respectively. Each data path goes to all of the direct access storage devices. Only one data path has access to a direct access storage device at a time however.

Control unit 28 is internally divided into four sections corresponding to independent power supplies. Two sections are storage clusters 72 and 74, respectively. A third section includes a memory cache 88. A fourth section includes a nonvolatile storage 90. Cache 88 provides storage for recently accessed data which is duplicated on the direct access storage devices. The presence of cache 88 and the use of multiple exposures enhances performance when accessing data stored on the direct access storage devices to which control unit 28 is attached. Nonvolatile storage 90 is used for temporary storage of data being written to a storage device in order to provide similar response times for cache writes and cache reads.

Storage clusters 72 and 74 mirror one another in terms of functional features. Accordingly only storage cluster 72 is described here. Storage cluster 72 includes a multipath storage director 92 which operates as a four or eight by two switch between the channels from the host computer systems and signal path processors 80 and 82. Storage cluster 72 also includes a shared control array 94, which duplicates the contents of shared control array 96 in storage cluster 74. Shared control arrays 94 and 96 store path group information as well as control blocks for the direct access storage devices. They are also used to store selected data structures utilized in practicing the method of the present invention, as described below.

Figure 4:
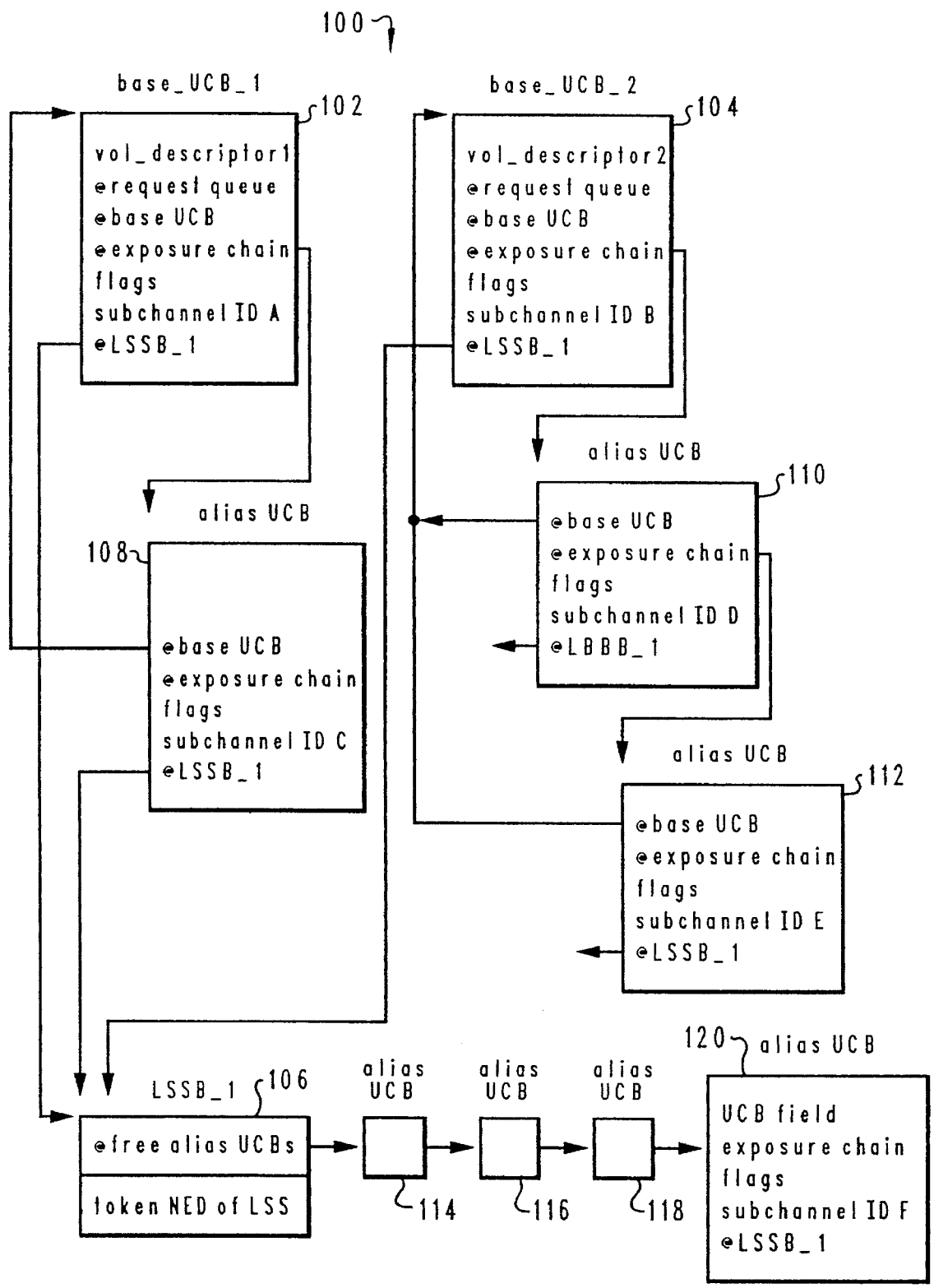
FIG. 4 is a data structure for logical subsystem of related subchannels for a host computer.

FIG. 4 illustrates a logical subsystem data structure 100 as maintained in main storage 35 of one of computer systems 12 or 14. Logical subsystems are groups of up to 256 device addresses, corresponding to the number of device addresses supported by the ESCON communication architecture for a single control unit. ESCON (also called Enterprise Systems Connection) is an assortment of IBM components providing a communication environment. A host computer may support one or more logical subsystems. Logical subsystem data structure 100 includes two base unit control blocks (UCB) 102 and 104. A base unit control block is so called because it corresponds to a subchannel which is dedicated to a particular input/output volume. A base unit control block includes several fields including: a descriptor field for a volume descriptor of the volume to which the unit control block, and its related subchannel, are dedicated; a request queue field for a pointer into a chained link of work elements for execution on the related volumes; a base UCB field for a pointer back into the base unit control block itself (this allows certain simplifications in programming because no reference need be made to type of unit control block in determining how to return to the base unit control block); an exposure chain field for a pointer into a queue of dependent alias unit control blocks; a field for flags indicating various status conditions, including whether use of an alias unit control block for the volume in the volume descriptor is permitted; a subchannel ID field for identifying the related subchannel by name; and a logical subsystem block (LSSB) field identifying the logical subsystem to which the unit control block belongs by providing an address of logical subsystem block 106. Unit control block 102 points to a chain comprising a single alias unit control block 108. Unit control block 104 points to a chain comprising alias unit control blocks 110 and 112.

Alias unit control blocks, like base unit control blocks, are permanently related on a one to one basis with a subchannel. Unlike a base unit control block neither they nor the related subchannel are permanently associated with an I/O volume. An alias unit control block, such as unit control block 108 may be temporarily bound, along with the related subchannel, to a volume for a given input/output operation. Accordingly, an input/output operation using alias unit control block 108 refers to base unit control block 102 to which the alias unit control block is linked for a volume descriptor (using the base UCB field). No volume descriptor field is provided in an alias unit control block. Because a plurality of alias unit control blocks may be assigned the same volume, an exposure chain field is provided in each alias unit control block for a pointer to another unit control block in the chain. The flags field of alias unit control block 108 provides a location for status indicators. A subchannel ID field identifies subchannel "C" as the related subchannel for alias unit control block 108. The LSSB field contains a pointer to the logical subsystem block 106.

Logical subsystem block 106 has as a primary function providing an anchor for a linked list or pool of free alias unit control blocks and as a reference linking all member unit control blocks of the logical subsystem. The linked list provides a pool of free alias unit control blocks from which a program executing on one of CPUs 31 or 33 can take an alias unit control block for an input/output operation. A linked list of four alias unit control blocks 114, 116, 118 and 120 is illustrated. Upon assignment of an alias unit control block to a volume the alias unit control block is removed from the linked list. Upon completion of an input/output operation on an alias unit control block it is returned to the linked list indicated by the pointer in the LSSB field. Alias unit control blocks are generally removed from and added to the front of the list. A free or unassigned alias unit control block 120 differs in values placed in a few fields from an assigned alias unit control block. The base UCB field becomes invalid and the exposure chain field is used for the pointers providing the links of the free list pool.

Figure 5:
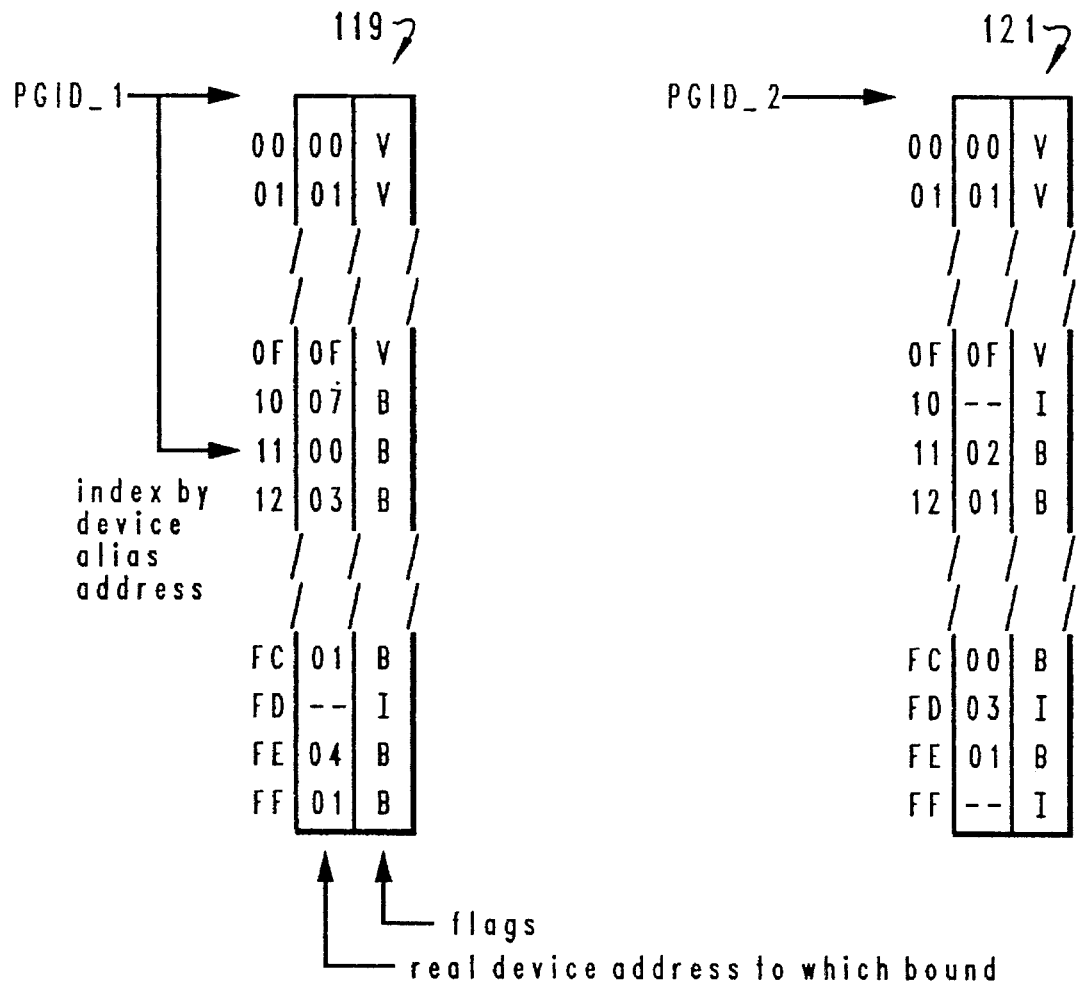
FIG. 5 is a data structure, used by a control unit relating device addresses to actual devices.

FIG. 5 illustrates data structures accessible to and maintained by a control unit in the shared control arrays. The data structures are tables 119 and 121 of associations for device aliases to device addresses of volumes. A table exists for each path group known to the control unit. The table entries have two fields with an entry being indexed by the device address on which the operation is received. The first field is for an actual device address of a volume, which may or may not be valid. The second field provides for a status flag which may be set to invalid (I), bound (B), or volume (V). The volume setting indicates that the device address corresponds to a volume rather than an alias.

Figure 6:
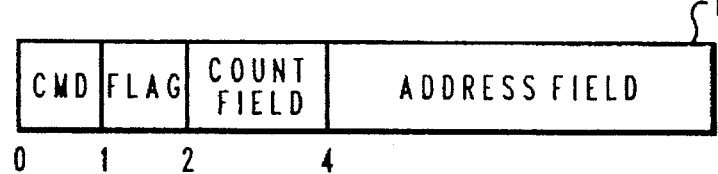
FIG. 6 illustrates a format for a channel command word.

FIG. 6 illustrates the format of a channel command word 122 used to initiate an alias binding operation when placed in a channel program. Binding of an alias to a volume in the path group tables occurs by issuing a channel command for that purpose in a channel program and passing out an identifier uniquely associated with the volume. The command code appears in the command code (CMD) field of the channel command word. Since the channel command is executed through a subchannel and on a channel path from a specific host and logical subsystem, it is implicitly sent to a control unit with an alias unit address (since binding is done only for aliases) on a specific path group. The address field includes a reference in main storage to a real device or volume identifier. The control unit binds the alias to a real address and sets the bound flag. The same device address can be bound to different volumes on different path groups.

Figure 7:
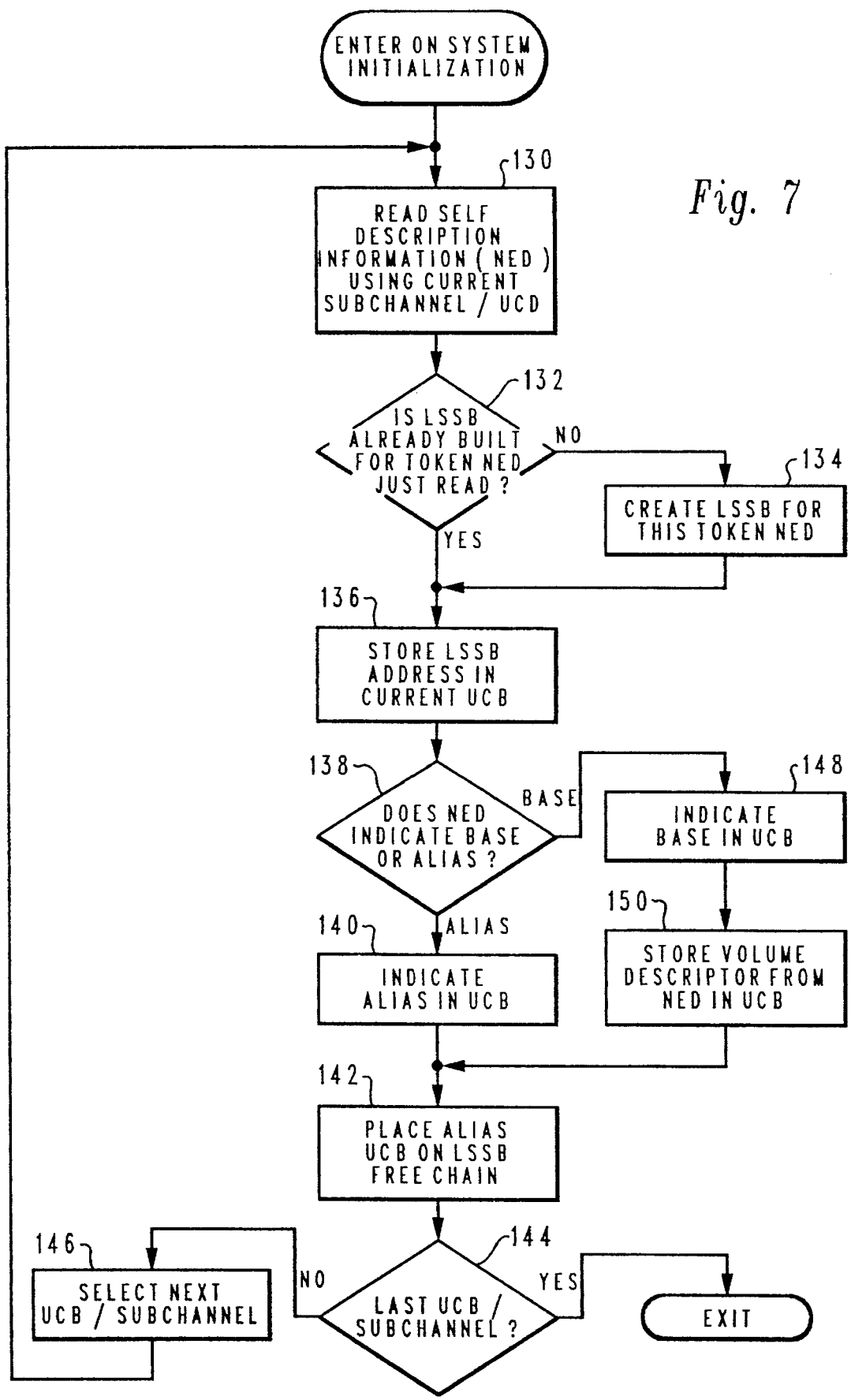
FIG. 7 is a logical flow chart illustrating a process for system initialization on a host computer.

FIG. 7 is a flow chart for a system initialization process. Entered with step 130, the process does a loop through steps 130–146 to categorize available addresses and aliases. Using a subchannel, a node element descriptor (NED) is read from the control unit for self-description information of the device address associated with the subchannel. An LSS is identified by a unique token NED, which is saved in the LSSB 106. At step 132, a determination is made as to whether a LSSB already exists for the logical subsystem associated with this subchannel. If one does not exist, a new LSSB is created in step 134. In step 136, a pointer to the LSSB is entered in the UCB associated with this subchannel (identifying the UCB with a logical subsystem). Next, with execution of step 138, it is determined if the device address associated with the subchannel corresponds to a volume or an alias. If it corresponds to a volume, the unit control block is marked as a base in step 148 and the volume descriptor for that volume is stored into the descriptor field, and processing continues with step 144. If the device address corresponds to an alias, the unit control block is marked as an alias in step 140. Step 142 is then executed to link the alias unit control block to the other alias unit control blocks for this logical subsystem.

Steps 144 and 146 provide looping control through all the subchannels and unit control blocks. Step 144 determines if the last subchannel and unit control block have been processed. If not, the next subchannel and unit control block are selected in step 146 and processing is returned to step 130. If the last subchannel has been processed, the initialization procedure is ended.

Figure 8:
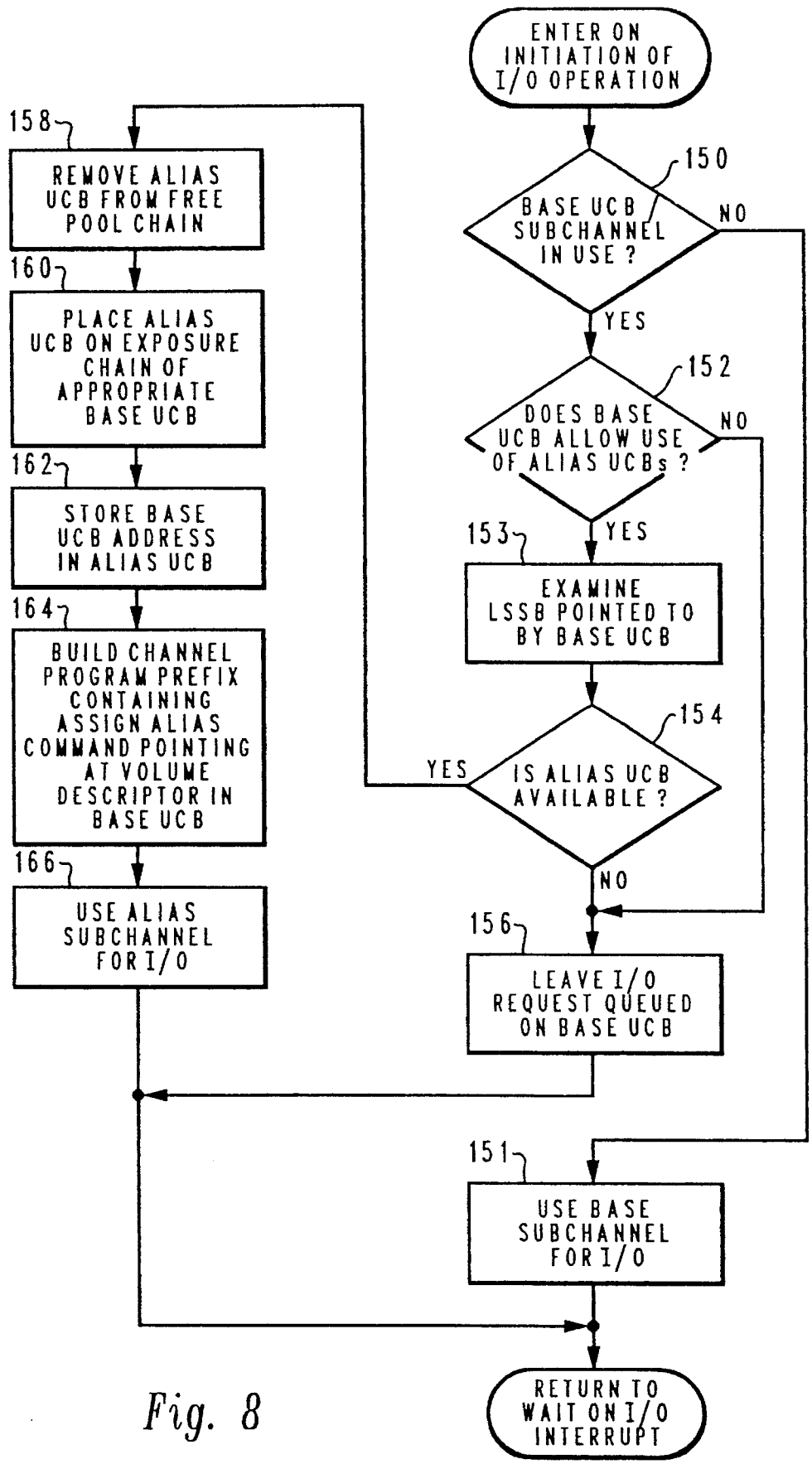
FIG. 8 is a logical flow chart illustrating a process for binding a subchannel to a device upon initiation of an I/O operation on a host computer.

FIG. 8 illustrates a process undertaken to secure a subchannel, including binding of an alias to a real volume, for carrying out of an input or output operation. The simplest case is where the base unit control block for the desired device or volume is available. This is tested for at the outset with execution of step 150. The NO branch, indicating that the base unit control block is not in use, leads to step 151 where the base unit control block and related subchannel are used for the input/output operation.

If the base unit control block was determined to be unavailable in step 150, step 152 is executed to examine the appropriate flag in the base unit control block to determine if use of alias unit control blocks is available. If alias unit control blocks may be used, step 153 is executed to examine the logical subsystem block pointed to by the base unit control block. At step 154 it is determined if alias unit control blocks are available in the free pool chain pointed to by the logical subsystem block. If no alias unit control blocks are available, or if their use was not permitted, step 156 is executed to place the I/O request on the base unit control block work queue. This involves resetting pointers on various work elements and possibly in the base unit control block (i.e. in the request queue field). A flag indicating presence of waiting work elements may also be set in the base unit control block.

Where the base unit control block is unavailable and alias unit control blocks are available, and their use permitted, execution of step 158 follows steps 150, 152, 153 and 154. With execution of step 158 an alias unit control block is removed from the linked list of unassigned unit control blocks. Next, with execution of step 160, the just removed alias unit control block is placed on the exposure chain of the appropriate base unit control block. This involves filling the base UCB field with an identifier and flagging the alias unit control block as assigned. Next, step 162 is executed to store the base unit control block address into the alias unit control block. Next, step 164 is executed to build a channel program prefix containing an assign alias channel command word pointing at a volume descriptor in a base unit control block. Last, step 166 represents use of the alias unit control block for an input or output operation. Following completion of step 151, 156 or 166 the process is terminated to await an I/O interrupt or upon an I/O request from a program.

Figure 9:
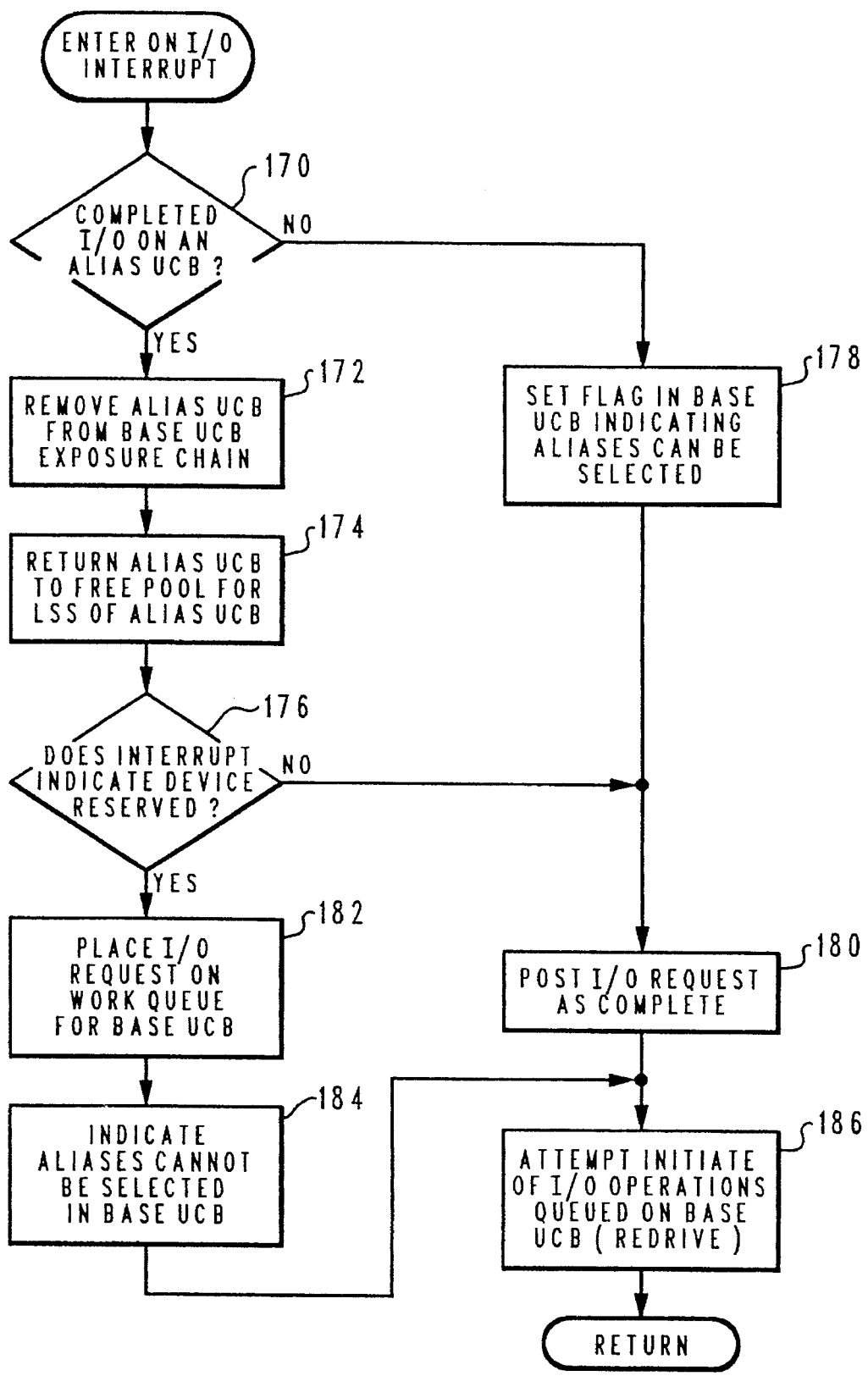
FIG. 9 is a logical flow chart illustrating a process for responding to an I/O interrupt on a host computer.

FIG. 9 is a logical flow chart of a process entered upon an I/O interrupt. When an I/O operation or sequence of I/O operations initiated by the execution of a START SUBCHANNEL is ended, the channel subsystem and the I/O device generate status conditions. The generation of these status conditions may be brought to the attention of a program executing on a CPU by means of an I/O interruption. The status condition, as well as an address and a count indicating the extent of the operation sequence, are presented to the program in the form of a subchannel status word. The process provides for handling certain status conditions such as reservation of a device which may have occurred, as well as completion of an input/output operation using a particular unit control block.

The process is entered at step 170, where it is determined if an input/output operation has been completed on an alias unit control block. If the operation was not completed on an alias unit control block, step 178 is executed to set a flag in the base unit control block for the effected volume or device indicating that alias unit control blocks may be selected. If the result of the test of step 170 is that the operation completed on an alias unit control block, step 172 is executed to remove the alias unit control block from the base unit control block exposure chain. Next, step 174 is executed to return the alias unit control block to the free pool linked to the logical subsystem block referenced in the alias unit control block. Following step 174, step 176 is executed to determine if the interrupt indicates the device the operation was just completed on is reserved to another system. If not, or following step 178, step 180 is executed to post completion of the I/O operation.

If device reservation to another system was indicated in the interrupt tested at step 176, step 182 is executed to place this I/O request on the work queue for the base unit control block. At step 184 the appropriate flags in the base unit control block are set to indicate that alias unit control blocks cannot be utilized. Following completion of steps 180 or 184, step 186 is executed to attempt initiation of any input/output operations queued on the base unit control block. Steps 150–166 of the process of FIG. 8 handle these operations. The process is then exited.

The foregoing represents a preferred embodiment of the invention for binding aliases to devices. However, other approaches may be used depending upon circumstances relating to expected duration of the binding or security concerns. For example, a BIND ADDRESS command could be sent over the base device address to a control unit, passing at the same time an operand including an identifier of the alias address to which the binding is to be made. Where a binding is expected to be of relatively long duration this technique may be preferred. When sending a BIND ADDRESS command over the base device address you have access to the base by definition. This simplifies handling of security. Alternatively, a BIND ADDRESS could be sent over any address currently associated with a volume, passing an identifier of the alias address to be bound with the device to which the address is currently associated (i.e. a command to bind the address passed to the control unit to the same volume with which it is currently associated).

The same basic mechanism of having the logical subsystem maintain addresses separate from volumes permits additional uses. By permitting volume descriptors for all volumes to be retrieved simultaneously using any device address, there is no need to maintain the concept of a "base UCB." This then permits a logical subsystem to provide more volumes than are directly addressable by any addressing limit imposed by the I/O interface architecture. For example, 256 separately addressable entities can be supported with an address field of 1 byte. The approach described herein can be used to access any volume, independent of the number provided, by dynamically binding one of the available device addresses to that volume. Because of addressing constraints, the maximum number of operations which can be outstanding simultaneously is limited to the number supported by the architecture. For example, with a 1 byte address field, 256 operations can be active simultaneously to any combination of 1–256 volumes, independent of the total number of volumes provided by the logical subsystem.

Elimination of the base UCB can be of value even when the total number of volumes does not exceed the addressing limits of the interface architecture. Base UCBs and subchannels consume a resource, namely one of the addresses available at the control unit, even when the volume with which they are associated is not in use. Placing all UCBs in a free pool permits a greater degree of concurrence for the active volumes.

An explicit command can be used to cause disassociation of an alias and a device. In the preferred embodiment bindings are left alone until reset by a new binding. Such additional functionality may be useful for diagnostic purposes.

Computers utilizing more than one operating system raise particular issues. If an operating system in one partition does not have access to a particular volume (i.e. there are no subchannels for it which permits it to get to a volume), then it should not be allowed to cause an alias to be bound to that volume since that would allow it to bypass security to get to data on the volume. The control unit is modified to reject a BIND ADDRESS if the volume to which the assignment is being requested does not have the path over which the command is received in a path group for the requesting system. The only way to place a path in a path group for a specific volume is to do input/output operations on the base address to that volume on that path and the existence of a path group on that path means the system issuing the command has a subchannel for the base volume.

Modeling of the system provided by the present invention suggests an improvement in input/output performance stemming from increases in controller cache hit ratios and increased concurrence of pending operations brought to the attention of controllers. These improvements in performance can be traded off allowing a reduction in cache size and are achieved with a fixed number of subchannels. The reasons for the improvement stem from the ability to provide additional subchannels to devices exhibiting heavier access traffic so that more pending operations on a device may be presented to the device. Dynamic assignment of subchannels to any volume within the LSS permits fewer subchannels to be used than static assignment of subchannels used by earlier multiple exposure examples. Since controllers provide some facility to optimize response by selecting those operations which can be most quickly performed, performance is improved. Cache hits are responded to before actual operations to disk or tape, reducing the frequency of record flushing from cache. In addition, fewer operations need wait on a disk or tape read/write to proceed before they are handled.

While the invention has been particularly shown and described with reference to a preferred embodiment, it will be understood by those skilled in the art that various changes in form and detail may be made therein without departing from the spirit and scope of the invention.

What is claimed is:

1. A data processing system for allocating unit control blocks and associated subchannels on a dynamic basis among input/output devices thereby allowing increased presentation of concurrent requests for access to multiple exposure input/output devices, the data processing system comprising:

a plurality of peripheral input/output devices;

a computer system having a plurality of unit control blocks for use in controlling input/output operations between main storage of the computer and the peripheral input/output devices;

a controller providing an interface for connection of the computer system and the plurality of peripheral input/output devices;

association tables accessible to the controller for listing device address and indicating whether each device address is valid or invalid, is an actual device or an alias device address, and to which actual device the alias device is bound;

means for dividing unit control blocks between first and second groups where the first group comprises base unit control blocks having a one to one correspondence with and dedicated to the peripheral input/output devices and the second group comprises alias unit control blocks available for association with selected peripheral input/output devices on demand; the alias unit control blocks each having a unique alias;

means for linking in a free pool, alias unit control blocks which are not associated with a peripheral input/output device; and means responsive to access of an alias unit control block for an input/output operation to a target peripheral input/output device for removing the alias unit control block from the free pool and dynamically linking the alias unit control block to an exposure chain depending from the base unit control block dedicated to target peripheral input/output device.

2. A data processing system as set forth in claim 1, and further comprising:

a plurality of logical subsystems including groups of peripheral input/output devices.

3. A data processing system as set forth in claim 1, and further comprising:

means responsive to initiation of an input/output operation by a computer central processing unit for accessing a unit control block for controlling the input/output operation.

4. A data processing system as set forth in claim 3 wherein the means for accessing a unit control block comprises:

means for querying a base unit control block for a target peripheral input/output device to determine availability of the base unit control block for the input/output operation; and means responsive to unavailability of the base unit control block for determining from the base unit control block if an alias unit control block may be used for control of the input/output operation and if a alias unit control block is present in the free pool.

5. A data processing system as set forth in claim 4, means for placing a channel program in main storage including a prefix channel command for execution by the controller to dynamically bind the alias for the alias unit control block with the target peripheral input/output device.

6. A data processing system as set forth in claim 5, wherein the prefix channel command implicitly identifies its source unit control block and includes an operand to identify the target peripheral input/output device the input/output operation is to be done on.

7. A data processing system as set forth in claim 4, and further comprising:

means responsive to an input/output interrupt for determining if an input/output operation has completed on an alias unit control block; and means responsive to an input/output operation completing on an alias unit control block for removing the alias unit control block from an exposure chain of a base unit control block and returning the alias unit control block to the free pool.

8. A data processing system as set forth in claim 4, and further comprising:

means responsive to unavailability of a base unit control block or an alias unit control block for queuing the input/output operation request in a linked list depending from the base unit control block.

9. A data processing system as set forth in claim 8, and further comprising:

means responsive to an input/output interrupt for determining if an input/output operation has completed on an alias unit control block; and means responsive to an input/output operation completing on an alias unit control block for removing the alias unit control block from an exposure chain from a base unit control block and returning the alias unit control block to a free pool.

10. A data processing system as set forth in claim 9, and further comprising:

means for posting an input/output operation as complete; and means responsive to posting completion of the input/output operation for attempting execution of the input/output operation requests on the linked list.

11. A data processing system as set forth in claim 10, and further comprising:

means for unbinding an alias from a real device address.

12. A data processing system as set forth in claim 11, and further comprising:

partitions on the computer system between each of a plurality of operating systems for concurrent execution; and means for rejecting a binding command where the binding command arrives on a path group other than one owned by a target peripheral input/output device.

13. A data processing system as set forth in claim 5, and further comprising:

means for sending a binding command to a controller over the base device address and passing an identifier of the alias for the alias unit control block.

14. A data processing system as set forth in claim 5, and further comprising:

means for sending a binding command to a controller over an alias device address which is currently bound to a device and including with the binding command an identifier of a new alias to bind with the device.

15. A method of presenting concurrent requests for access to multiple exposure peripheral devices for a data processing system having a plurality of peripheral input/output devices and a computer, wherein the computer has a plurality of subchannels available for handling input/output operations to the peripheral devices, the method comprising the steps of:

dividing the subchannels into a first group comprising base subchannels having a one to one correspondence with and dedicated to the peripheral devices and a second group comprises alias subchannels which are available for dynamic association with the multiple exposure peripheral devices on a demand basis;

binding base unit control blocks permanently to the particular peripheral devices to which they are dedicated;

upon system initialization, placing subchannel identifiers of the alias subchannels for a given logical subsystem in a linked free pool;

to initiate an input/output operation to a target peripheral device, interrogating a base subchannel for a target peripheral device to determine its availability;

if the base subchannel is available, utilizing it to handle the input/output operation;

if the base subchannel is not available, determining from the free pool if an alias subchannel is available and if it may be used;

if a base subchannel is available and may be used, utilizing the alias subchannel for the input/output operation by:

removing a unit block for a subchannel from the free pool and linking it to a unit control block of the base subchannel for the target peripheral device in an exposure chain;

placing a channel program in main storage of the computer including a prefix channel command for binding the alias for the alias subchannel with a particular device;

upon execution of the prefix channel command, passing a binding command to a controller for the target peripheral device and placing record of the binding in a table of affiliations between aliases and peripheral devices; and responsive to unavailability of either base subchannel or alias subchannel, queuing the input/output operation.

16. A method as set forth in claim 15, and further comprising the steps of:

responsive to an input/output operation completing, determining if the input/output operation completed on an alias subchannel;

if the result of the immediately preceding step is affirmative, removing a unit control block for the alias subchannel from an exposure chain of a base subchannel and replacing the unit control block in a free pool; and posting the input/output operation as complete.

17. A method as set forth in claim 16, and further comprising the step of:

after posting of the input/output operation as complete, reattempting any queued input/output operation requests.

18. A data processing system for allocating unit control blocks and associated subchannels on a dynamic basis among input/output devices thereby allowing increased presentation of concurrent requests for access to multiple exposure input/output devices, the data processing system comprising:

a plurality of peripheral input/output devices;

a computer having a plurality of logical subsystems each comprising at least a first unit control block for use in controlling input/output operations between main storage of the computer and the peripheral input/output devices, with each unit control block on the computer having a unique alias address, and wherein the peripheral input/output devices are each associated to a particular logical subsystem of the computer;

means for retrieving an operand used to identify a target input/output device;

means for retrieving all descriptors using any device address:

means for associating a unit control block of a logical subsystem with a peripheral input/output device associated with the same logical subsystem on demand;

means for linking in a free pool any unit control blocks for a logical subsystem when not associated with a peripheral input/output device; and means responsive to access of a unit control block for an input/output operation to a target peripheral input/output device for removing the unit control block from the free pool and dynamically linking the unit control block to an exposure chain for the target peripheral input/output device.

19. A data processing system as set forth in claim 18, wherein no unit control blocks are permanently associated with a peripheral input/output device.

20. A data processing system as set forth in claim 19, wherein the means for linking initially places all unit control blocks in the free pool allowing greater utilization of unit control blocks and subchannels and access to a greater number of volumes than is supported by interface architecture addressing.

* * * * *